United States Patent Office 3,457,244
Patented July 22, 1969

3,457,244
PROCESS FOR PREPARING A POLYMER
Jun-Ichi Fukuda, Kijuro Tashiro, Akira Yamamoto, and Akihiko Katsuyama, Yokkaichi-shi, Japan, assignors to Mitsubishi Petrochemical Company Limited, Tokyo, Japan
No Drawing. Filed Apr. 19, 1965, Ser. No. 449,298
Claims priority, application Japan, Apr. 28, 1964, 39/23,770
Int. Cl. C08f 1/42, 15/04, 17/00
U.S. Cl. 260—80.78                                           9 Claims

ABSTRACT OF THE DISCLOSURE

Ethylene and an α-olefin are copolymerized in the presence of an aliphatic alcohol having from 1 to 12 carbon atoms using a vanadium oxytrichloride-alkylaluminum catalyst composition. Optionally, a non-conjugated diene such as dicyclopentadiene may be included in the reaction mixture to produce a terpolymer.

The polymeric products are elastomeric and exhibit identical X-ray and infrared absorption spectra as do known high molecular weight linear amorphous polymers and terpolymers and can be used in various synthetic rubber applications.

---

The present invention relates to a process for preparing an amorphous copolymer from ethylene and an α-olefin, and also a process for preparing an amorphous terpolymer from ethylene, α-olefin and non-conjugated diene.

It has been known well heretofore that an amorphous elastomer may be produced by copolymerizing ethylene with other α-olefin, or, by terpolymerizing ethylene with other α-olefin and non-conjugated diene under relatively mild temperature and pressure conditions by use of catalyst composition consisting of a vanadium compound, for example, vanadium tetrachloride, vanadium oxytrichloride, vanadium triacetylacetonate, vanadyl diacetylacetonate, trialkyl vanadate VO(OR)$_3$, or halogenated alkyl vanadate VO(OR)X$_2$ or VO(OR)$_2$X, and a alkylaluminum compound, for example, trialkylaluminum AlR$_3$, dialkylaluminum monohalide AlR$_2$X, monoalkylaluminum dihalide AlRX$_2$ or alkylaluminum sesquihalide Al$_2$R$_3$X$_3$. In these chemical formulae for alkylaluminum compounds, R is a member selected from the group consisting of methyl, ethyl, propyl, butyl, hexyl and octyl groups, and X is a member selected from the group consisting of chlorine, bromine and iodine.

In the process mentioned above, though it partly depends upon the particular alkylaluminum compound to be used, in general, a catalyst composition obtained by use of vanadium compounds containing alkoxy group such as trialkyl vanadate VO(OR)$_3$, monohalogenated dialkyl vanadate VO(OR)$_2$Cl, and dihalogenated monoalkyl vanadate VO(OR)X$_2$, are not only suitable for preparing copolymer of narrower molecular weight distribution and monomer distribution but also the yield of copolymer obtainable per unit weight of catalyst is extremely high. However, these vanadium compounds are, respectively, very expensive and accordingly have economical disadvantage.

One object of the present invention is to provide an inexpensive catalyst composition, without using such expensive vanadium compounds containing alkoxy group as mentioned hereinabove, having an equal or even higher polymerizing performance.

Another object of the present invention is to provide a process for preparing a copolymer from ethylene and other α-olefin using such a catalyst composition.

Still another object of the present invention is to provide a process for preparing a terpolymer from ethylene, other α-olefin and non-conjugated diene using such a catalyst composition.

We have found that in the process of preparing an amorphous copolymer from ethylene and other α-olefin, or, an amorphous terpolymer from ethylene, other α-olefin and non-conjugated diene, in the presence of catalyst composition consisting of alkylaluminum compound and vanadium oxytrichloride soluble in a hydrocarbon, the activity of catalyst can be greatly increased and the yield of copolymer or terpolymer obtained per unit weight of catalyst can also be remarkably increased by adding a certain alcohol to said catalyst composition. Based upon this discovery, the present invention has been accomplished.

Namely, the present invention relates to a process for preparing an amorphous copolymer from ethylene and α-olefin, or, an amorphous terpolymer from ethylene, α-olefin and non-conjugated diene, by copolymerizing ethylene with α-olefin or by terpolymerizing ethylene with α-olefin and non-conjugated diene, using a catalyst composition consisting of vanadium oxytrichloride and alkylaluminum compound in the presence of alcohol.

As α-olefin usable in the process of the present invention are compounds represented by the general formula

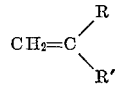

wherein R is a hydrogen atom or an alkyl group, and R' is an alkyl, cycloalkyl or aryl group, said compounds include, for example, propylene, buten-1, penten-1, hexen-1, hepten-1, octen-1, isobutylene, 5-methylpenten-1, styrene, α-methylstyrene, vinylcyclohexane and the like.

As for non-conjugated diene, 1,4-pentadiene, 1,4-hexadiene, 1,5-cyclooctadiene, methyltetrahydroindene, ethyltetrahydroindene, dicyclopentadiene, 2-methyl-norbornadiene and the like may be given.

As alcohols suitable for the process of the present invention, alcohols having one to twelve (12) carbon atoms, for example, methyl alcohol, ethyl alcohol, n-propyl alcohol, iso-propyl alcohol, n-butyl alcohol, sec.-butyl alcohol, tert.-butyl alcohol, iso-butyl alcohol, n-amyl alcohol, n-hexyl alcohol, n-heptyl alcohol, 2-ethylhexanol, n-octanol, dodecyl alcohol and the like may be used, however, above all, the alcohols having two (2) to eight (8) carbon atoms, which are sufficiently dried, are most preferable.

The amount of alcohol to be added can be very small and remarkably good result is obtainable from mere addition of alcohol of 0.01 to 5 mols, preferably 1 to 3 mols, per mol of vanadium oxytrichloride.

The process of the present invention can be carried out in many different ways: for instance, firstly alcohol and vanadium oxytrichloride are mixed in an inert solvent with sufficient stirring, and secondly alkylaluminium compound is added to said mixture and lastly said solution is contacted with starting monomers. However, far better way is mixing the alcohol and vanadium compound in an inert solvent and nextly mixing said mixture with alkylaluminum compound in the presence of monomers. The latter method is particularly suitable for obtaining copolymers or terpolymers of narrower molecular weight distribution.

In the process of the present invention, either continuous system or batch system may be employed with or without using an inert organic solvent as diluent. However, in general, it is desirable to use a diluent. As the diluent, optional inert organic solvents, for example, aliphatic hydrocarbons such as pentane, hexane, heptane and the like, alicyclic hydrocarbons such as cyclohexane, methylcyclohexane and the like, aromatic hydrocarbons such as benzene, toluene, xylene and the like, and the mixture thereof, and halogenated hydrocarbons such as tetrachloroethylene, chlorobenzene and the like may be employed.

The polymerization temperature and pressure in the process of the present invention are variable in accordance with the kinds of monomers and catalyst compositions to be used, however, in general optional temperature ranging from −50° C. to 150° C., preferably within the range of −30° C. to 80° C., may be selected. As for the pressure, likewise, the range within the atmospheric pressure to superatmospheric pressure, preferably range of 0 to 20 kg./cm.$^2$ (gauge), may be applied.

The molecular weight of copolymers or terpolymers to be prepared in the process of the present invention can be controlled in accordance with the method employed in the process of co-ordinated anion polymerization using Ziegler-Natta catalyst. For example, the molecular weight can be controlled by effecting the copolymerization in the presence of particular organometallic compound such as dialkyl zinc, or, by adding small amount of hydrogen to the monomer mixture.

The copolymers or terpolymers produced in the process of the present invention exhibit completely identical X-ray and infrared absorption spectra with those of high molecular linear amorphous copolymers or terpolymers known heretofore and can be used successfully in many different ways in the field of synthetic rubber industries.

The process of the present invention is characterized in that remarkably high yield of copolymer or terpolymer is obtainable, due to the greatly increased activity of catalyst, which is effected by adding said alcohol to the catalyst composition comprising inexpensive vanadium oxytrichloride and alkylaluminum compound soluble in a hydrocarbon.

The present invention may further be explained practically in the following examples, but it should not be understood that they restrict the present invention.

Example 1

After a 3 liter flask provided with a stirrer, a thermometer, a gas inlet and outlet, and a liquid inlet is dried and flushed with nitrogen, 1.5 liters of heptane and 3 ml. of dicyclopentadiene are placed therein. Gaseous mixture of ethylene and propylene of 1:3 by volume is supplied thereto and saturated in the solution while maintaining the temperature of the solution at 0° C.

Thereafter, 3.43 g. of ethylaluminum sesquichloride and a mixture prepared by mixing 0.3 g. of vanadium oxytrichloride and an amount of alcohol listed in Table 1 shown below, in heptane for about 15 minutes beforehand at an ambient temperature are added to the solution in order. The reactants are stirred at 0° C. for 20 minutes while introducing said gaseous mixture.

After the reaction is completed, the catalyst contained is deactivated by adding 600 ml. of aqueous solution containing 0.3 g. of (Stabilizer 2246) (2,2′-methylene-bis(4-methyl-6-tert-butylphenol)) and 0.15 g. of polyoxyethylene octylphenol ether which is a surfactant, and then the introduction of said gaseous mixture is stopped.

The resulting polymerization mixture in which the catalyst has been deactivated is heated at 50° C. for an hour, and then the aqueous layer separated by standing still is wasted off. The solvent is removed by usual stripping of the polymer layer, and thereafter, the resulting terpolymer is dried at 60° C. for 8 hours under a reduced pressure.

The yield and the physical properties of the resulting terpolymer are shown in Table 1 hereinbelow.

TABLE 1

| | Experiment No. | | | | | | |
|---|---|---|---|---|---|---|---|
| | 101 | 102 | 103 | 104 | 105 | 106 | 107 |
| Alcohol added | | Ethyl alcohol | | n-Butyl alcohol | | n-Octyl alcohol | |
| Molar ratio of alcohol to VOCl$_3$ | 0 | 1 | 2 | 1 | 2 | 1 | 2 |
| Yield of terpolymer (g.) | 80.3 | 95.9 | 97.5 | 103.6 | 97.7 | 98.4 | 101.2 |
| Content of propylene in the terpolymer (percent by weight) | 60 | 61 | 65 | 64 | 66 | 63 | 68 |
| Iodine number | 8.6 | 6.6 | 6.5 | 6.7 | 6.4 | 6.3 | 7.0 |
| η sp./c.[1] | 2.31 | 1.99 | 1.92 | 1.75 | 1.87 | 2.42 | 1.73 |
| Content of gel (percent by weight) | 6.6 | 3.5 | 2.6 | 7.7 | 6.7 | 2.5 | 5.0 |

[1] Measured at 30° C. in toluene in the concentration of 0.1 g./100 ml.

In Table 1, Experiment No. 101 shows a control which is carried out in the absence of alcohol. As noted from Table 1, the presence of alcohol permits the yield of the terpolymer obtained to increase extremely.

Example 2

The procedure of Example 1 is followed except that dicyclopentadiene is not added and an equimolar ethylalcohol is added to vanadium oxytrichloride, and also as a control an experiment is carried out under the same conditions except for the absence of ethylalcohol.

The yield of copolymer obtained from ethylene and propylene is 83.3 g. in case of the latter, whereas, it is 150.3 g. in case of the former. As is clearly noted from these data, the addition of alcohol is very effective to increase the yield of copolymer.

Example 3

The procedure of Example 1 is repeated except that 1.5 mol of n-butylalcohol per mol of vanadium oxytrichloride is added, and also as a control an experiment is carried out in the absence of n-butylalcohol using $$VO(OC_2H_5)Cl_2$$

and $VO(OC_2H_5)_2Cl$ as a catalyst.

The yield and the physical properties of the resulting terpolymer are shown in Table 2 below.

According to the process of the present invention, the yield of the obtained terpolymer is higher than that in case of using expensive halogenated alkyl vanadate. The terpolymer obtained in both processes of the present invention and a control has almost same properties, and, for example, has the same infrared absorption spectrum.

TABLE 2

| | Experiment No. | | |
|---|---|---|---|
| | 301 | 302 | 303 |
| Vanadium compound used | VOCl$_3$ | VO(OC$_2$H$_5$)Cl$_2$ | VO(OC$_2$H$_5$)$_2$Cl |
| Alcohol added | n-Butyl alcohol | None | None |
| Yield of terpolymer (g.) | 112 | 81.5 | 86.2 |
| Content of propylene in the terpolymer (percent by weight) | 63 | 65 | 64 |
| Iodine number | 6.7 | 8.0 | 6.8 |
| η sp./c | 1.88 | 2.19 | 2.50 |
| Content of gel (percent by weight) | 7.7 | 7.5 | 4.2 |

Example 4

Polymerization is carried out in an autoclave having capacity of 5 liters following to the procedure given in Example 1 except that varying the catalyst compositions as shown in Table 3 under a given condition of polymerization temperature of 20° C., polymerization pressure, 4 kg./cm.² (gauge); amount of heptane supplied, 3 liter/hr.; amount of dicyclopentadiene supplied, 13.5 milliliter/hr.; supplied ethylene/propylene ratio, 1:2.5; concentration of hydrogen in gaseous phase of autoclave, 3.2% by volume.

The yield and physical properties of the obtained terpolymer are given in Table 3, and it is clearly noted that the yield of the resultant terpolymer in the process of the present invention is extremely higher than that of using an expensive halogenated alkyl vanadate or obtained in the absence of alcohol, furthermore, the resultant terpolymer has almost the same physical properties with that obtained in the other processes.

The terpolymer prepared in process of the present invention (Experiment No. 401) is compounded at the following ratio, and vulcanized at 160° C. for 40 minutes. To 100 parts by weight of the terpolymer, 50 parts by weight of carbon black (HAF), 5 parts by weight of zinc white, 1.5 parts by weight of sulfur, 1 part by weight of stearic acid, 0.5 part by weight of a vulcanizing accelerator DM (2-benzothiazolyl disulfide), 1.5 parts by weight of a vulcanizing accelerator TT (tetramethylthiuram disulfide) and 0.5 parts by weight of age-resistor, phenyl-$\beta$-naphthylamine, are compounded.

The resulting vulcanized product shows excellent physical properties as indicated, for example, in the tensile strength of 221 kg./cm.², 300% modulus of 188 kg./cm.², TABLE 3.—EXPERIMENTAL DATA OBTAINED BY USING DIISOBUTYL-ALUMINUM MONOCHLORIDE-VANADIUM CATALYST

|  | Experiment No. | | |
| --- | --- | --- | --- |
|  | 401 | 402 | 403 |
| Aluminum compound used | Al(iso-Bu)₂Cl [1] | Al(iso-Bu)₂Cl [1] | Al(iso-Bu)₂Cl [1] |
| Amount thereof (g./hr.) | 2.14 | 2.14 | 2.14 |
| Vanadium compound used | VOCl₃ | VOCl₃ | VO(OH)Cl₂ |
| Amount thereof (g./hr.) | 0.150 | 0.150 | 0.180 |
| Molar ratio of n-butyl-alcohol added to VOCl₃ | None | 1.0 | None |
| Yield of terpolymer obtained per gram of vanadium compound (g.) | 950 | 1,027 | 895 |
| Content of propylene in the terpolymer (percent by weight) | 43 | 43 | 43 |
| Iodine number | 13.6 | 12.7 | 13.1 |
| η sp./c | 1.75 | 1.92 | 1.88 |
| Content of gel (percent by weight) | 6.8 | 0.6 | 1.0 |
| Mooney viscosity ML₁₊₄ (100° C.) | 77 | 87 | 87 |

[1] Represents diisobutylaluminum monochloride.

Example 5

Polymerization is carried out in accordance with the procedures given in Example 4 except that the concentration of hydrogen is increased to 18% by volume and the catalyst composition is varied as shown in Table 4.

The yield and physical properties of the resultant terpolymer are shown in said Table 4 and it is clearly noted that the yield of terpolymer in the process of the present invention is extremely higher than that of the other processes and the resulting terpolymer has almost the same physical properties with that obtained in the other processes.

elongation of 360%, and the tear resistance of 82 kg./cm.

Example 6

Polymerization is conducted following the procedures given in Example 4 except that the catalyst composition is varied as shown in Table 5.

The yield and physical properties of the resultant terpolymer are shown in Table 5, from which it is clearly understood that the yield of terpolymer in the process of the present invention is remarkably higher than that of the other processes and yet the physical properties thereof are almostly identical with those obtained in the other processes.

TABLE 4.—EXPERIMENTAL DATA OBTAINED BY USING ETHYLALUMINUM SESQUICHLORIDE VANADIUM CATALYST

|  | Experiment No. | | |
| --- | --- | --- | --- |
|  | 501 | 502 | 503 |
| Aluminum compound used | Al₂Et₃Cl₃ [1] | Al₂Et₃Cl₃ [1] | Al₂Et₃Cl₃ [1] |
| Amount thereof (g./hr.) | 1.4 | 1.72 | 1.72 |
| Vanadium compound used | VOCl₃ | VOCl₃ | VO(OEt)Cl₂ |
| Amount thereof (g./hr.) | 0.145 | 0.150 | 0.186 |
| Molar ratio of n-butyl-alcohol added to VOCl₃ | 1.0 | None | None |
| Yield of terpolymer obtained per gram of vanadium compound (g.) | 1,242 | 888 | 1,030 |
| Content of propylene in the terpolymer (percent by weight) | 48 | 48 | 50 |
| Iodine number | 11.8 | 15.1 | 10.7 |
| η sp./c | 1.41 | 1.67 | 1.32 |
| Content of gel (percent by weight) | 1.2 | 0.8 | 11.4 |
| Mooney viscosity ML₁₊₄(100° C.) | 55 | 83 | 45 |

[1] Represents ethylaluminum sesquichloride.

TABLE 5.—EXPERIMENTAL DATA OBTAINED BY USING DIETHYL-ALUMINUM MONOCHLORIDE-VANADIUM CATALYST

|  | Experiment No. | | |
| --- | --- | --- | --- |
|  | 601 | 602 | 603 |
| Aluminum compound used | AlEt₂Cl [1] | AlEt₂Cl [1] | AlEt₂Cl [1] |
| Amount thereof (g./hr.) | 1.41 | 1.47 | 1.43 |
| Vanadium compound used | VOCl₃ | VOCl₃ | VO(OEt)Cl₂ |
| Amount thereof (g./hr.) | 0.147 | 0.155 | 0.185 |
| Molar ratio of n-butylalcohol added to VOCl₃ | 1.0 | None | None |
| Yield of terpolymer obtained per gram of vanadium compound (g.) | 1,071 | 903 | 987 |
| Content of propylene in the terpolymer (percent by weight) | 42 | 45 | 44 |
| Iodine number | 8.9 | 12.6 | 9.1 |
| η sp./c | 1.66 | 1.81 | 1.49 |
| Content of gel (percent by weight) | 2.9 | 6.0 | 1.0 |
| Mooney viscosity ML₁₊₄(100° C.) | 62 | 60 | 54 |

[1] Represents diethylaluminum monochloride.

What we claim is:

1. Process for preparing an amorphous copolymer from ethylene and α-olefin which comprises copolymerizing said ethylene and α-olefin in the presence of alcohol having from one to twelve carbon atoms using a catalyst composition comprising vanadium oxytrichloride and alkylaluminum compound, said alcohol being present in the amount of from 0.01 to 5.00 mole per mole of vanadium oxytrichloride.

2. Process for preparing an amorphous terpolymer from ethylene, α-olefin and non-conjugated diene which comprises terpolymerizing said ethylene, α-olefin and non-conjugated diene in the presence of alcohol having from one to twelve carbon atoms using a catalyst composition comprising vanadium oxytrichloride and alkylaluminum compound, said alcohol being present in the amount of from 0.01 to 5.00 mole per mole of vanadium oxytrichloride.

3. Process according to claim 1 wherein said alcohol is a member selected from the group consisting of ethyl alcohol, n-butyl alcohol and n-octyl alcohol.

4. Process according to claim 1 wherein said α-olefin is propylene.

5. Process according to claim 2 wherein said non-conjugated diene is dicyclopentadiene.

6. Process according to claim 2 wherein said alcohol is a member selected from the group consisting of ethyl alcohol, n-butyl alcohol and n-octyl alcohol.

7. Process according to claim 2 wherein said α-olefin is propylene.

8. The process according to claim 1 wherein the ratio of aluminum alkyl to vanadium oxytrichloride is from 3.43–1.41:0.3–0.147 parts by weight.

9. The process according to claim 2 wherein the ratio of aluminum alkyl to vanadium oxytrichloride is from 3.43–1.41:0.3–0.147 parts by weight.

References Cited
UNITED STATES PATENTS 3,168,588    2/1965    White et al. _____ 260—683.15
3,211,709    10/1965   Adamek et al. _____ 260—80.7

JAMES A. SEIDLECK, Primary Examiner

STANFORD M. LEVIN, Assistant Examiner

U.S. Cl. X.R.

260—88.2